United States Patent [19]

Müller et al.

[11] Patent Number: 5,166,232
[45] Date of Patent: Nov. 24, 1992

[54] CELLULOSE/PLASTIC BLENDS, A PROCESS FOR THEIR PRODUCTION AND THEIR USE

[75] Inventors: Hanns-Peter Müller, Bergisch Gladbach; Tillmann Hassel, Cologne; Gunter Weber, Fallingbostel, all of Fed. Rep. of Germany

[73] Assignee: Wolff Walsrode Aktiengesellschaft, Walsrode, Fed. Rep. of Germany

[21] Appl. No.: 671,064

[22] Filed: Mar. 18, 1991

[30] Foreign Application Priority Data

Mar. 27, 1990 [DE] Fed. Rep. of Germany ....... 4009758

[51] Int. Cl.$^5$ ................................................ C08L 1/00
[52] U.S. Cl. ........................................ 524/35; 524/36; 523/124; 523/125; 523/128
[58] Field of Search ...................... 523/124, 125, 128; 524/35, 36

[56] References Cited

U.S. PATENT DOCUMENTS 4,181,637  1/1980  Busch et al. ..................... 524/710

FOREIGN PATENT DOCUMENTS 2634774  2/1990  France .
1250326  10/1971  United Kingdom .

Primary Examiner—Paul R. Michl
Assistant Examiner—Edward Cain
Attorney, Agent, or Firm—Sprung Horn Kramer & Woods

[57] ABSTRACT

Blends of cellulose and a polyurethane (urea) have improved properties in relation to other cellulose blends and can be used as a biodegradable packaging material.

10 Claims, No Drawings

CELLULOSE/PLASTIC BLENDS, A PROCESS FOR THEIR PRODUCTION AND THEIR USE

This invention relates to new blends based on cellulose hydrate and polyurethane, the terms mixtures, blends and alloys being used synonymously hereinbelow.

The invention also relates to a process for the production of the cellulose/plastic blends and to their use.

Molded articles of cellulose hydrate are preparably produced by the viscose process (K. Götze, Chemiefasern nach dem Viskoseverfahren, 3rd Edition, Vols. 1 and 2, Springer Verlag, 1967). The alkaline cellulose xanthogenate solution—generally referred to as the viscose solution—is extruded, for example, through an annular or slot-like die, coagulated with acidic solution to form a cellulose hydrate gel and then regenerated to cellulose hydrate.

The properties of the resulting moldings can be varied within certain limits through the composition of the viscose, the subsequent ripening process and the incorporation of standard auxiliaries and additives.

However, one of the disadvantages of cellulose hydrate moldings is that they become increasingly hard and brittle during storage. Another disadvantage of cellulose hydrate moldings, particularly films, is the fact that they crackle and tear easily.

Some cellulose blends are known from the literature. Y. Nishio and R. St. John Manley describe cellulose/polyvinyl alcohol blends in Macromolecules 1988, 21, 1270–1277.

Blends of regenerated cyanoethyl cellulose and acrylonitrile are known from U.S. Pat. No. 3,721,582.

Blends of regenerated cellulose and polyvinyl pyrrolidone are known from U.S. Pat. No. 3,951,889.

According to J. P. Kokai 57/117636, articles of silk are treated with a formaldehyde/urea copolymer.

DE-A 37 11 571 describes a process which is intended to improve the mechanical properties of cellulose through the use of permanent plasticizers.

Other processes known from the literature are concerned with the production of cellulose hydrate by the carbamate process using dimethyl acetamide/LiCl and by the physical spinning process using N-methylmorpholine-N-oxide as solvent.

However, the known processes for the production of cellulose molded articles and cellulose blends result in products, e.g. films which have disadvantageous technological properties compared with modern plastic films.

It is therefore the object of the present invention to provide cellulose mixtures whose mechanical properties, such as tear resistance, elasticity and freedom from crackling, can form those of modern plastics and which are at the same time biologically degradable or, compostable.

These novel films and molded articles are used for example as packaging materials, bin liners, plastic shopping bags, mulch and silo sheets for the agricultural sector, hygiene articles, external wrappings for babies' nappies, transparent paper, copying films and decorative materials.

The present invention relates to blends of cellulose and at least one additional component, characterized in that the additional component of the blend is a polyurethane (urea). In one preferred embodiment, at least 20% by weight of the blend consists of cellulose hydrate. In another preferred embodiment, at least 5% of the additional component of the blend is a polyurethane (urea). In another preferred embodiment, polyvinyl pyrrolidone, polyvinyl alcohol and/or polyethylene oxide polyethers, more particularly having a molecular weight of 10,000 to 50,000, may be present in addition to the polyurethane (urea) as an additional component of the blend.

Other preferred embodiments are characterized in that the polyurethane (urea) used contains 0.1 to 40 milliequivalents of ionic groups or of groups convertible into ionic groups, based on 100 g polyurethane (urea), and 0.5 to 10% by weight ethylene oxide units incorporated in polyether chains.

Other preferred embodiments are characterized in that the polyurethane used is preferably synthesized from isophorone diisocyanate, hexamethylene diisocyanate and $H_{12}$-MDI.

Other preferred embodiments are characterized in that chain-extending agents of the butane diol, hexane diol, ethylene glycol, hexamethyl diamine, bis-(3-aminopropyl)methyl amine type are optionally used either individually or in admixture with one another in the synthesis of the polyurethane used.

Other preferred embodiments are characterized in that the polyurethane used is synthesized from water-soluble polyethers having a molecular weight in the range from 4000 to 10,000 and diisocyanates.

The present invention also relates to a process for the production of cellulose/plastic blends which is characterized in that viscose is mixed with the components of the blend, optionally using other auxiliaries and additives, the resulting mixture is converted into cellulose hydrate gel blends by acidic coagulants and regenerating agents at T>40° C., treated with standard plasticizers and, finally, dried.

In one preferred embodiment, the polyurethane used is used in liquid form in solution or dispersion in water.

The polyurethane (ureas) to be used in accordance with the invention are understood to be both pure polyurethanes and also polyurethanes in which the polyurethane groups are partly replaced by polyurea groups.

Preferred polyurethanes can be obtained from at least one diisocyanate, at least one macropolyol, including a relatively high molecular weight hydroxyl compound having a molecular weight below 400, and optionally at least one short-chain chain-extending agent having a molecular weight of at most 399, more particularly a short-chain diol.

In principle, it is possible to use any known aromatic, alicyclic and aliphatic polyisocyanates. However, linear products are synthesized using in particular diisocyanates corresponding to the formula $Q(NCH)_2$, in which Q is an aromatic hydrocarbon radical containing 6 to 15 carbon atoms, an aliphatic hydrocarbon radical, a cycloaliphatic or a mixed aliphatic/cycloaliphatic hydrocarbon radical containing 2 to 15 carbon atoms. Examples of such diisocyanates are tolylene diisocyanate, naphthylene diisocyanate, diphenylmethane diisocyanate, hexamethylene diisocyanate (HDI), isophorone diisocyanate (IPDI), cyclohexane-1,4-diisocyanate and perhydrodiphenylmethane diisocyanate. These isocyanates may also be used in the form of mixtures. IPDI, HDI and perhydrodiphenylmethane diisocyanate ($H_{12}$-MDI) are preferred.

Polyester, polyether, polythioether, polylactone, polycarbonate, polyester carbonate, polyether carbonate, polyacetal and polyester amide polyols may be used as macropolyols for the synthesis of the polyurethane. In this case, too, it is particularly favorable to use macropolyols having an OH functionality of 2.

The polyamines obtainable from the macropolyols may be used as the macropolyamines. In this case, too, it is particularly favorable to use macrodiamines. The use of macropolyols is particularly preferred.

Particularly preferred compounds are polyester diols, polyamide diols, polyether diols, polythioether diols, polylactone diols, polycarbonate diols, polyether carbonate diols, polyacetal diols and polyamide diols.

The polyether diols which may advantageously be used in accordance with the invention are known per se and are obtained, for example, by polymerization of epoxides, such as ethylene oxide, propylene oxide, butylene oxide, tetrahydrofuran, styrene oxide or epichlorohydrin, on their own, for example in the presence of Lewis catalysts, such as $BF_3$, or by addition of these epoxides, preferably ethylene oxide and propylene oxide, optionally in admixture or successively, onto starter components containing reactive hydrogen atoms, such as water, diols, primary amines, for example ethylene glycol, 1,3- or 1,2-propylene glycol, 4,4'-dihydroxydiphenyl propane, aniline methylamine. In many cases, it is preferred to use polyethers predominantly containing primary OH groups (up to 90% by weight, based on all the OH groups present in the polyether). Polybutadienes containing OH groups are also suitable for use in accordance with the invention.

Among the polythioether diols, the condensation products of thiodiglycol on its own and/or with other glycols, dicarboxylic acids, formaldehyde and/or aminocarboxylic acids, are mentioned in particular. Depending on the co-components, the products are, for example, polythio mixed ether, polythioether ester or polythioether ester amide diols. Polylactone diols are understood to be the products obtained when a monolactone is subjected to ring-opening polymerization using one of the above-mentioned diols as starter. Suitable lactones are, for example, butyrolactone and ε-caprolactone.

Suitable polycarbonate diols are those known per se which are obtained, for example, by reaction of diols, such as propane-1,3-diol, butane-1,4-diol and/or hexane-1,6-diol, diethylene glycol, triethylene glycol, tetraethylene glycol or thiodiglycol, with diaryl carbonates, for example diphenyl carbonate, or phosgene (DE-A-I 694 080, DE-A-1 915 908 and DE-A-2 221 751; DE-OS 2 605 024). If, instead of the diols, short-chain polyether diols or polyester diols are used for this reaction, polyether carbonate or polyester carbonate diols are formed.

Suitable polyacetal diols are, for example, the compounds obtainable from glycols, such as diethylene glycol, triethylene glycol, 4,4'-dioxethoxy diphenyl dimethyl methane, hexane diol and formaldehyde. Polyacetal diols suitable for the purposes of the invention may also be prepared by polymerization of cyclic acetals, such as trioxane for example (DE-OS 1 694 128).

The polyester amide and polyamide diols include, for example, the linear condensates obtained from dibasic, saturated carboxylic acids or anhydrides thereof and difunctional, saturated aminoalcohols, diamines and mixtures thereof. Macropolyamines, more particularly macrodiamines, may also be used as the macromolecular compounds. Macropolyamines such as these may be obtained, for example, from polyether polyols by direct reaction with ammonia in accordance with DAS 1 215 373. However, the macropolyols may also be converted into isocyanate prepolymers with diisocyanates, preferably aromatic diisocyanates, and the resulting prepolymers hydrolyzed to the amino-terminated compounds.

Suitable chain-extending agents are the short-chain, generally isocyanate-difunctional alcohols, amines and aminoalcohols typically used in polyurethane chemistry. Examples of such compounds are alcohols, such as ethylene glycol, butane-1,4-diol, hexane-1,6-diol, neopentyl glycol, hydroquinone bis-2-hydroxyethyl ether, 1,4-cyclohexane diol, diethylene glycol, 4,4'-dihydroxy dicyclohexyl methane; amines, such as ethylene diamine, N,N'-dimethyl ethylene diamine, 1,6-diaminohexane, isophorone diamine, 4,4'-diaminodicyclohexyl methane, N,N',N''-trimethyl diethylene triamine, piperizine and aminoethyl piperizine. Examples of suitable aminoalcohols are ethanolamine and N-2-hydroxyethyl piperizine.

Chain regulators may optionally be used in known manner to regulate the molecular weight of the polyurethane (ureas) suitable for use in accordance with the invention. The chain regulators in question are monofunctional isocyanates, alcohols and/or amines, such as for example butyl isocyanate, phenyl isocyanate, ethanol, isopropanol, decanol or dibutylamine, hexylamine, morpholine.

Other suitable auxiliaries and additives are, on the one hand, the catalysts known to experts in polyurethane chemistry, such as for example tin(II) octoate, dibutyl tin dilaurate, titanium tetrabutylate, iron(II) acetyl acetonate, diazabicyclooctane and N,N-tetramethyl ethylene diamine. Other additives are, for example, fillers and reinforcing materials, such as glass fibers, carbon fibers, $TiO_2$, diatomaceous earth, aromatic polyamides, LC polyesters, even in ground form, silica flour and polyureas and also soluble dyes and inorganic or organic pigments.

The polyurethane (urea)s used in the process according to the invention to improve mechanical properties and brittleness preferably have a content of chemically incorporated hydrophilic groups guaranteeing dispersibility in water in the form of a) ionic groups and/or b) groups convertible into ionic groups by a neutralization reaction and/or c) ethylene oxide units (—$CH_2C$-$H_2O$—) within polyether chains incorporated in the polyurethane (urea) molecule.

In principle, any aqueous polyurethane (urea) dispersions known per se which form tack-free films on drying and which are largely immune to coagulation by electrolytes—optionally through the presence of alcohols and optionally other organic solvents—are suitable for the process according to the invention. It has been found that the mechanical properties of the polyurethane (urea), for example tensile strength and elongation at break, are also reflected in the properties of the cured composite material.

Numerous processes are known for the production of polyurethane (urea) dispersions in water. A comprehensive account can be found, for example, D. Dieterich and H. Reiff in "Die Angewandte Makromolekulare Chemie", 26, 1972 (pages 85–106); D. Dieterich et al. in "Angewandte Chemie", 82, 1970 (pages 53–63); D. Dieterich et al. in J. Oil Col. Chem. Assoc. 1970, 53 (363–379); D. Dieterich in "Die Angewandte Makromolekulare Chemie", 98, 1981 (pages 133–158) and in "Chemie und Technologie makromolekularer Stoffe" (29. Veröffentlichung der Fachhochschule Aachen zum 9. Kolloquium am 8. Mai 1981 an der FH Aachen, Fachbereich Chemieingenieurwesen). A comprehensive literature review can also be found in these references. Hereinafter the term "polyurethane" will also be understood to include polymers containing urea groups, i.e. polyurethane ureas, unless otherwise specifically stated.

One of the processes preferably used in practice for the production of aqueous polyurethane dispersions comprises reacting NCO prepolymer dissolved in an organic solvent with a chain-extending agent. Either the prepolymer or the chain-extending agent contains ionic groups or groups capable of forming ions. These groups capable of forming ions are converted into ionic groups in the course of, or after, the polyaddition reaction. The aqueous dispersion is formed at the same time or even subsequently by addition of water and removal of the organic solvent by distillation.

As already mentioned, both cationic and also anionic and nonionic polyurethane dispersions can be used in the process according to the invention. According to the invention, aqueous polyurethane dispersions which form polyurethane films having elastic properties on drying are preferably used. They are understood to include in particular rubber-elastic or at least high-impact polyurethanes or polyureas or polyhydrazodicarbonamides which have a ball indentation hardness of less than 1400 kp/cm$^2$ (60 seconds in accordance with DIN 53 456) and preferably a Shore D hardness of less than 98. Dispersions of harder polyurethanes may of course also be used in individual cases for composite materials having special properties.

As mentioned above, aqueous polyurethane dispersions suitable for the process according to the invention may be obtained quite generally when the production of the polyurethanes is carried out using components which contain ionic groups or groups capable of forming ions and, in addition, at least one NCO group or at least one isocyanate-reactive hydrogen atom. The following are examples of suitable compounds of this type, which may even be used in admixture with one another (see also U.S. Pat. No. 3,756,992, U.S. Pat. No. 3,479,310 or U.S. Pat. No. 4,108,814):

1) Compounds containing basic tertiary amino groups which can be neutralized with aqueous acids or quaternized a) Alcohols more particularly alkoxylated aliphatic, cyclomore aliphatic, aromatic and heterocyclic, secondary amines, for example N,N-dimethyl ethanolamine, N,N-diethyl ethanolamine, N,N-dibutyl ethanolamine, 1-dimethylamino-2-propanol, N,N-methyl-β-hydroxyethyl aniline, N,N-methyl-β-hydroxypropyl aniline, N,N-ethyl-β-hydroxyethyl aniline, N,N-butyl-β-hydroxyethyl aniline, N-ethoxyl piperidine, N-ethoxyl morpholine, α-hydroxyethyl pyridine and γ-hydroxyethyl chinoline.

b) Diols and triols more particularly alkoxylated aliphatic, cyclomore aliphatic, aromatic and heterocyclic, primary amines, for example, N-methyl diethanolamine, N-butyl diethanolamine, N-oleyl diethanolamine, N-cyclohexyl diethanolamine, N-methyl diisopropanolamine, N-cyclohexyl diisopropanolamine, N,N-diethoxyl aniline, N,N-diethoxyl-m-toluidine, N,N-diethoxyl-p-toluidine, N,N-dihydroxypropyl naphthylamine, N,N-tetraethoxyl- -aminopyridine, diethoxyl piperizine, polyethoxylated butyl diethanolamine, polypropoxylated methyl diethanolamine (molecular weight 1000), poly-propoxylated methyl diethanolamine (molecular weight 2000), polyesters containing tertiary amino groups, tri-[2-hydroxy-1-propyl]-amine, N,N-di-n-(2,3-dihydroxypropyl)-aniline, N,N'-dimethyl-N,N'-bis-hydroxyethyl hydrazine and N,N'-dimethyl-N,N'-bis-hydroxypropyl ethylene diamine.

c) Aminoalcohols for example addition products - obtained by hydrogenation - of alkylene oxide and acrylonitrile with primary amines, for example N-methyl-N-(3-aminopropyl)-ethanolamine, N-cyclohexyl-N-(3-aminopropyl)-propan-2-olamine, N,N-bis-(3-aminopropyl)-ethanolamine and N-3-aminopropyl diethanolamine.

d) Amines for example N,N-dimethyl hydrazine, N,N-dimethyl ethylenediamine, 1-diethylamino-4-aminopentane, α-aminopyridine, 3-amino-N-ethyl carbazole, N,N-dimethyl propylene diamine, N-aminopropyl piperidine, N-aminopropyl morpholine, N-aminopropyl ethylene imine and 1,3-bis-piperidino-2-aminopropane.

e) Diamines, triamines, amides more particularly compounds obtainable by hydrogenation of adducts of acrylonitrile with primary or disecondary amines, for example bis-(3-aminopropyl)-methylamine, bis-(3-aminopropyl)-cyclohexylamine, bis-(3-aminopropyl)-aniline, bis-(3-aminopropyl)-toluidine, diaminocarbazole, bis-(aminopropoxyethyl)-butylamine, tris-(aminopropyl)-amine or N,N'-bis-carbonamidopropyl hexamethylene diamine, and by addition of acrylamide onto diamines or diols.

Compounds containing halogen atoms capable of quaternization reactions or corresponding esters of strong acids 2-chloroethanol, 2-bromoethanol, 4-chlorobutanol, 3-bromopropanol,β-chloroethylamine, 6-chlorohexylamine, ethanolamine sulfuric acid ester, N,N-bis-hydroxyethyl-N'-m-chloromethyl phenyl urea, N-hydroxyethyl-N'-chlorohexyl urea, glycerol aminochloroethyl urethane, chloroacetal ethylenediamine, bromoacetyl dipropylene triamine, trichloroacetyl triethylene tetramine, glycerol-α-bromohydrin, polypropoxylated glycerol-α-chlorohydrin, polyesters containing aliphatically bound halogen or 1,3-dichloro-2-propanol.

The following are mentioned as corresponding isocyanates:

chlorohexyl isocyanate, m-chlorophenyl isocyanate, p-chlorophenyl isocyanate, bis-chloromethyl diphenylmethane diisocyanate, 2,4-diisocyanatobenzyl chloride, 2,6-diisocyanatobenzyl chloride, N-(4-methyl-3-isocyanatophenyl)-β-bromomethyl urethane.

3) Compounds containing carboxylic acid or hydroxyl groups capable of salt formation a) Hydroxycarboxylic and mercaptocarboxylic acids glycolic acid, thioglycolic acid, lactic acid, trichlorolactic acid, malic acid, dihydroxy maleic acid, dihydroxy fumaric acid, tartaric acid, dihydroxytartaric acid, mucic acid, saccharic acid, citric acid, glyceroboric acid, pentaerythritol boric acid, mannitol boric acid, salicylic acid, 2,6-dihydroxy benzoic acid, protocatechusic acid, α-resorcylic acid, β-resorcylic acid, hydroquinone-2,5-dicarboxylic acid, 4-hydroxyisophthalic acid, 4,6-dihydroxy isophthalic acid, hydroxyterephthalic acid, 5,6,7,8-tetra-hydro-2-naphthol-3-carboxylic acid, 1-hydroxy-2-naphthoic acid, 2,8-dihydroxy-3-naphthoic acid, β-hydroxy propionic acid, m-hydroxy benzoic acid, pyrazolone carboxylic acid, uric acid, barbituric acid, resols and other formaldehyde-phenol condensation products.

b) Polycarboxylic acids sulfodiacetic acid, nitrilotriacetic acid, ethylenediamine tetracetic acid, diglycolic acid, thiodiglycolic acid, methylene-bis-thioglycolic acid, malonic acid, oxalic acid, succinnic acid, glutaric acid, adipic acid, maleic acid, fumaric acid, gallic acid, phthalic acid, tetrachlorophthalic acid, isophthalic acid, terephthalic acid, naphthalene-1,4,5,8-tetracarboxylic acid, α-tolylimidodiaceticacid, β-naphthylimidodiacetic, pyridine dicarboxylic acid, dithiodipropionic acid.

c) Aminocarboxylic acids oxaluric acid, anilinoacetic acid, 2-hydroxycarbazole-3-carboxylic acid, glycine, sarcosine, methionine, α-alanine, β-alanine, 6-aminocaproic acid, 6-benzoylamino-2-chlorocaproic acid, 4-aminobutyric acid, aspartic acid, glutamic acid, histidine, anthranilic acid, 2-ethylaminobenzoic acid, N-(2-carboxyphenyl)-aminoacetic acid, 2-(3'-aminobenzenesulfonylamino)-benzoic acid, 3-aminobenzoic acid, 4-aminobenzoic acid, N-phenylaminoacetic acid 3,4-diaminobenzoic acid, 5-aminobenzene dicarboxylic acid, 5-(4'-aminobenzoylamino)-2-aminobenzoic acid.

d) Hydroxysulfonic and carboxysulfonic acids 2-hydroxyethane sulfonic acid, phenol-2-sulfonic acid, phenol-3-sulfonic acid, phenol-4-sulfonic acid, phenol-2,4-disulfonic acid, sulfoacetic acid, m-sulfobenzoic acid, p-sulfobenzoic acid, 1-benzoic acid-3,5-disulfonic acid, 2-chloro-1-benzoic acid-4-sulfonic acid, 2-hydroxy-1-benzoic acid-5-sulfonic acid, 1-naphthol sulfonic acid, 1-naphthol disulfonic acid, 8-chloro-1-naphthol disulfonic acid, 1-naphthol trisulfonic acid, 2-naphthol-1-sulfonic acid, 2-naphthol trisulfonic acid, 1,7-dihydroxy-3-naphthalene sulfonic acid, 1,8-dihydroxynaphthalene-2,4-disulfonic acid, chromotropic acid, 2-hydroxy-3-naphthoic acid-6-sulfonic acid, 2-hydroxycarbazole-7-sulfonic acid.

e) Aminosulfonic acids amidosulfonic acid, hydroxylamine monosulfonic acid, hydrazine disulfonic acid, sulfanilic acid, N-phenylaminomethane sulfonic acid, 4,6-dichloroaniline-2-sulfonic acid, 1,3-phenylenediamine-4,6-disulfonic acid, N-acetyl-1-naphthylamine-3-sulfonic acid, 1-naphthylamine sulfonic acid, 2-naphthylamine sulfonic acid, naphthylamine disulfonic acid, naphthylamine trisulfonic acid, 4,4'-di-(p-aminobenzoylamino)-diphenylurea-3,3'-disulfonic acid, phenyl hydrazine-2,5-disulfonic acid, 2,3-dimethyl-4-aminoazobenzene-4',5-disulfonic acid, 4'-aminostilbene-2,2'-disulfonic acid-4-azo-4-anisole, carbazole-2,7-disulfonic acid, taurine, methyl taurine, butyl taurine, 3-amino-1-benzoic acid-5-sulfonic acid, 3-aminotoluene-N-methanesulfonic acid, 6-nitro-1,3-dimethylbenzene-4-sulfamic acid, 4,6-diaminobenzene-1,3-disulfonic acid, 2,4-diamino-5-toluene sulfonic acid, 4,4'-diaminodiphenyl-2,2'-disulfonic acid, 2-aminophenol-4-sulfonic acid, 4,4'-diaminodiphenylether-2-sulfonic acid, 2-aminoanisole-N-methane sulfonic acid, 2-aminodiphenylamine sulfonic acid.

Suitable salt-forming agents for group 1 are inorganic and organic acids and also compounds containing reactive halogen atoms and corresponding esters of strong acids. Examples of such compounds include hydrochloric acid, nitric acid, hypophosphorous acid, amidosulfonic acid, hydroxylamine monosulfonic acid, formic acid, acetic acid, glycolic acid, lactic acid, chloroacetic acid, bromoacetic acid ethyl ester, sorbitol boric acid, methyl chloride, butyl bromide, dimethyl sulfate, diethyl sulfate, benzyl chloride, p-toluene sulfonic acid methyl ester, methyl bromide, ethylene chlorohydrin, ethylene bromohydrin, glycerol-α-bromohydrin, chloroacetic ester, chloroacetamide, bromoacetamide, dibromoethane, chlorobromobutane, dibromobutane, ethylene oxide, propylene oxide, 2,3-epoxypropanol.

However, the compounds of group 2 may also be quaternized or ternized with tertiary amines and with sulfides or phosphines. In this case, quaternary ammonium and phosphonium or ternary sulfonium salts are formed.

Examples of such quaternizing agents are inter alia trimethyl amine, triethyl amine, tributyl amine, pyridine, triethanolamine and the compounds mentioned under groups 1a) and 1b), also dimethyl sulfide, diethyl sulfide, thiodiglycol, thiodiglycolic acid, trialkyl phosphines, alkyl aryl phosphines and triaryl phosphines.

Suitable salt formers for the compounds of group 3 are inorganic and organic bases, for example sodium hydroxide, potassium hydroxide, potassium carbonate, sodium hydrogen carbonate, ammonia, primary, secondary and tertiary amines. Finally, it is pointed out that other suitable salt formers are organic phosphorus compounds, including both incorporable basic phosphines, such as for example diethyl-β-hydroxyethyl phosphine, methyl bis-β-hydroxyethyl phosphine, tris-β-hydroxymethyl phosphine and also derivatives, for example of phosphinic acids, phosphonous acids, phosphonic acids and esters of phosphorous acid and phosphoric acid and also thioanalogs thereof, for example bis-(α-hydroxyisopropyl)-phosphinic acid, hydroxyalkane phosphonic acid or phosphoric acid bis-glycol ester.

Cationic polyurethanes suitable for the purposes of the invention are obtained, for example, in accordance with DAS 1 270 276 providing at least one component containing one or more basic tertiary nitrogen atoms is used in the synthesis of the polyurethane and the basic tertiary nitrogen atoms of the polyurethane are reacted with alkylating agents or with inorganic or organic acids. Basically, the position of the basic nitrogen atoms in the polyurethane macromolecule is not important.

Conversely, polyurethanes containing reactive halogen atoms capable of quaternization may also be reacted with tertiary amines. In addition, cationic polyurethanes may also be produced by chain-extending quaternization, for example by preparing dihalourethanes from optionally relatively high molecular weight diols and isocyanates containing reactive halogen atoms or diisocyanates and haloalcohols and reacting the dihalourethanes thus formed with ditertiary amines. Conversely, ditertiary diaminourethanes may be prepared from compounds containing two isocyanate groups and tertiary aminoalcohols and may be reacted with reactive dihalogen compounds. The cationic polyurethane may of course also be prepared from a cationic salt-like starting component, for example a quaternized basic polyether or a quaternary nitrogen-containing isocyanate. These synthesis methods are described, for example, in DE-ASS 1 184 946, 1 178 586 and 1 179 363, in U.S. Pat. No. 3,686,108 and in BE-PSS 653 223, 658 026 and 636 799. The starting materials suitable for the synthesis of the salt-like polyurethanes are also mentioned therein.

Anionic polyurethane dispersions may also be produced by methods known per se. Suitable anionic polyurethanes are described, for example, in DAS 1 237 306, in DOS 1 570 565, in DOS 1 720 639 and in DOS 1 495 847. Starting compounds containing carboxyl or sulfonate groups as ionic groups are preferably used.

The anionic dispersions may also be produced from polyurethanes containing free hydroxyl and/or amino groups by reaction thereof with aliphatic or aromatic aldehydes and, at the same time or subsequently, with a metal sulfite, metal hydrosulfite, metal aminocarboxylate or metal aminosulfate. Finally, another possible method is to react polyurethanes containing free hydroxyl and/or amino groups with cyclic compounds containing 3 to 7 ring members which contain salt-like groups or groups which are capable of salt formation after ring opening (see DAS 1 237 306). Compounds such as these include, in particular, sultones, such as 1,3-propane sultone, 1,4-butane sultone or 1,8-naphthsultone, and lactones, such as β-propiolactone or γ-butyrolactone, and also dicarboxylic anhydrides, for example succinic anhydride.

Cationic or anionic polyurethanes suitable for the process according to the invention may also be prepared in accordance with DAS 1 770 068 by polycondensation of formaldehyde. To this end, relatively high molecular weight polyisocyanates are reacted with an excess of compounds containing terminal methylol groups (for example amine-formaldehyde resins or phenol-formaldehyde resins), the reaction product containing methylol groups is dispersed in water and, finally, is crosslinked by heat treatment with formation of methylene bridges.

Products of the type described in DE-OSS 1 953 345, 1 953 348 and 1 953 349 may also be used in the process according to the invention. The products in question are aqueous dispersions of ionic emulsion polymers which are prepared by radical emulsion polymerization of olefinically unsaturated monomers in the presence of cationic or anionic oligo- or polyurethanes.

Sedimenting, but redispersible aqueous dispersions of cationic or ionic polyurethanes which are chemically crosslinked may also be used in accordance with the invention.

Crosslinked polyurethane particles of the type in question may be produced by various methods known in principle to the expert. In general, crosslinked polyurethane particles may be produced both in the form of a suspension in suitable organic solvents or even in water using a liquid medium. In addition, it is possible in each of these processes directly to obtain crosslinked particles by selecting suitable reaction components or initially to produce predominantly linear thermoplastic particles and subsequently to crosslink the particles thus produced.

A solvent in which one or even more of the reactants, but not the high molecular weight reaction product is soluble is generally selected for the preparation of a suspension in an organic medium. During the reaction in such a medium, the solution initially formed gradually changes into a suspension, this process preferably being supported by stirring. It is crucial that the crosslinking phase should only begin after formation of the disperse phase because otherwise gelation will occur. It is also possible to use solvents which dissolve the still uncrosslinked, but already high molecular weight polyurethane under the effect of heat, but not at room temperature. The suspension may then be obtained from the solution by cooling and stirring. The same effect may also be obtained by addition of a non-solvent, although the non-solvent must be miscible with the solvent. The formation of a disperse phase having the desired particle size may be influenced by addition of suitable dispersants.

There are a number of known processes for the production of fine-particle polyurethanes in aqueous media. For example, a solution of a polyurethane in a water-immiscible solvent may be dispersed in water using an emulsifier and the organic solvent removed by distillation. In one particularly preferred method, ionically and/or hydrophilically modified polyurethanes are mixed with water in the presence or absence of a solvent, polyurethane suspensions being formed in dependence upon the constitution and the reaction conditions. In one particularly preferred variant of this process, isocyanate-terminated or methylol-terminated polyurethane prepolymers are used. This variant may be carried out with highly concentrated solutions or even in the complete absence of solvents. The coarse emulsions initially formed change into high molecular weight polyurethane urea suspensions by reaction of the isocyanate groups with water or with di- or polyisocyanates dissolved in the aqueous phase, the reaction being accompanied by chain extension and crosslinking. The chain extension of prepolymers containing methylol groups may be obtained, for example, by heating or by lowering the pH value.

Suitable suspensions may also be prepared by spraying high molecular weight polyurethanes or reactive precursors thereof into water or organic non-solvents.

In principle, any methods proposed for the production of polyurethane dispersions or latices may also be used for the production of polyurethane suspensions providing measures are taken to ensure that the suspensions do not coalesce by sedimentation or under the effect of shear forces. This means that a primary suspension which is still not of sufficiently high molecular weight must be agitated until the dispersed particles are tack-free. To crosslink the dispersed particles, it is possible to start out either from more than bifunctional starting materials, i.e. for example to use branched polyesters or polyethers, triisocyanates or triols in the synthesis of the polyurethane or to react an initially linear NCO pre-polymer, i.e. an NCO prepolymer prepared from bifunctional components, with amines of relatively high functionality to form a crosslinked polyurethane urea. However, it is also possible to synthesize crosslinked particles from purely bifunctional components by working under conditions which promote branching, for example by addition of catalysts that promote the trimerization of isocyanates or the formation of allophanate or biuret structures. In the presence of water and/or diamines, even the use of more than equivalent quantities of isocyanate in relation to the hydroxyl or amine compounds present often leads to crosslinking.

Linear high molecular weight polyurethanes may also be subsequently crosslinked in the form of a suspension in a liquid medium, for example by treatment with polyisocyanates or formaldehyde or formaldehyde donors. Products containing basic groups may be crosslinked, for example, with polyfunctional quaternizing agents or acids while products containing acidic groups may be crosslinked with metal oxides or polyamines. Polyurethanes containing unsaturated double bonds may be crosslinked, for example, with radical formers known per se or sulfur, polymercaptans and other at least bifunctional agents capable of reacting with double bonds.

A detailed description of the production of crosslinked ionic polyurethane suspensions can be found, for example, in DE-ASS 1 495 745 (U.S. Pat. No.

3,479,310), 1 282 962 (CA-PS 837,174) and 1 694 129 (GB-PS 1,158,088) and in DE-OSS 1 595 687 (U.S. Pat. No. 3,814,095), 1 694 148 (U.S. Pat. No. 3,622,527), 1 729 201 (GB-PS 1,175,339) and 1 770 068 (U.S. Pat. No. 3,756,992).

As already mentioned, nonionic self-emulsifying aqueous polyurethane dispersions may be used instead of cationic and anionic polyurethane dispersions for the process according to the invention.

Nonionic, emulsifier-free polyurethane dispersions suitable for the process according to the invention are produced, for example, by the process according to DE-OS 2 141 807:

1 Mol of a trifunctional polyether polyol is reacted with 3 mol diisocyanate. The isocyanate adduct formed is reacted with a mixture of a) a monofunctional low molecular weight alcohol and b) a reaction product of a monofunctional alcohol or a monocarboxylic acid and ethylene oxide (molecular weight approx. 600)
in such a way that a prepolymer containing 1 mol of the monofunctional polyethylene oxide adduct to approximately 3000 molecular weight units is formed. This prepolymer is emulsified in water using mechanical dispersion units to form a latex which is subjected to the final polymerization by reaction with water or any other chain-extending agent known from polyurethane chemistry.

Self-dispersible, nonionic polyurethane dispersions which may be used in the process according to the invention may also be prepared in accordance with DE-OSS 2 314 512, 2 314 513 and 2 320 719 by incorporation of lateral polyethylene oxide units attached by allophanate or biuret groups in linear polyurethanes.

The polyurethanes self-dispersible in water are prepared by methods known per se in polyurethane chemistry by reaction of organic compounds containing isocyanatereactive hydrogen atoms which are difunctional in the context of the isocyanate polyaddition reaction and have a molecular weight in the range from 500 to 6000 and preferably in the range from 600 to 3000 with organic diisocyanates and, optionally, the difunctional chain-extending agents having a molecular weight below 500 which are known per se in polyurethane chemistry. It is essential in this regard to use organic diisocyanates corresponding to the following general formula

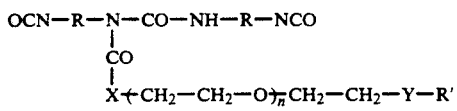

in which
R is an organic residue of the type obtained by removal of the isocyanate groups from an organic diisocyanate having a molecular weight in the range from 112 to 1000,
R' is a monofunctional hydrocarbon radical containing 1 to 12 carbon atoms,
X and Y may be the same or different and represent oxygen or a group of the formula —N(R")—, where R" is a monofunctional hydrocarbon radical containing 1 to 12 carbon atoms, and
n is an integer of 9 to 89.

These special diisocyanates are preferably used in admixture with unmodified diisocyanates corresponding to the general formula R(NCO)$_2$, the diisocyanate mixtures used having to contain between 5 and 100 mol-% and preferably between 10 and 50 mol-% of modified diisocyanates.

Self-dispersible, nonionic polyurethane dispersions may also be obtained by introduction of polyethylene oxide side chains via the diol components. In addition to the above-mentioned relatively high molecular weight diols, diisocyanates R(NCO)$_2$ and, optionally, chain-extending agents, it is also possible to use diols corresponding to the following general formula

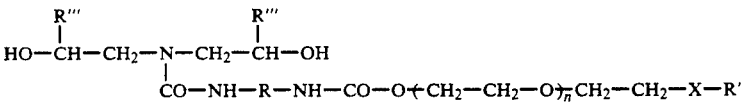

in which
R is a difunctional residue of the type obtained by removal of the isocyanate groups from a diisocyanate having a molecular weight in the range from 112 to 1000,
X represents oxygen or —NR"—,
R' and R" may be the same or different and represent monofunctional hydrocarbon radicals containing 1 to 12 carbon atoms,
R''' represents hydrogen or a monofunctional hydrocarbon radical containing 1 to 8 carbon atoms and
n is an integer of 4 to 89.

Dispersions prepared with the aid of emulsifiers may also be used in the process according to the invention. Products of this type are described, for example, in DAS 1 097 673 and in an Article by S. P. Suskind in Journal of Applied Polymer Science, 9 (1965), pages 2451-2458.

Aqueous polyurethane dispersions modified by ionic and nonionic-hydrophilic groups are preferably used in the process according to the invention. Adequate electrolyte stability is advantageously obtained with this combination, even in the absence of alcohols. The production of polyurethane dispersions such as these is also known per se and is described, for example, in DE-OSS 2 551 094, 2 651 506 and 2 651 505. Aqueous polymer latices with no tendency to coagulate, for example acrylate dispersions and polyvinyl acetate dispersions, may also be used as an additive to the aqueous polyurethane dispersions.

Ionic/nonionic-hydrophilic polyurethanes are generally produced as follows: to synthesize the high molecular weight polyurethanes, bifunctional, linear polyethers or polyesters having a molecular weight in the range from about 400 to 10,000 are reacted with diisocyanates in the presence of nonionic-hydrophilic modifying components and, optionally, chain-extending agents and ionic-hydrophilic components of the type discussed above to form prepolymers which are then reacted with a chain-extending agent, such as diamines and/or hydrazine or, optionally, aldimines, ketimines or aldazines or ketazines, generally in a solvent, preferably acetone, to form a high molecular weight polyurethane. The acetone solution of the high molecular weight polyurethane is then mixed with water and the acetone is distilled off. The aqueous polyurethane dispersions may also be prepared by the melt dispersion process, particularly where the so-called ketimine process is applied.

The ionic groups or the groups convertible into ionic groups are introduced into the ionic/nonionic-hydrophilic polyurethanes preferred for the process according to the invention in known manner by using compounds containing ionic groups or groups convertible into ionic groups which, at the same time, contain isocyanate groups or preferably isocyanate-reactive groups, such as in particular alcoholic hydroxyl groups of the type described in detail in the foregoing. If it is desired to introduce free carboxyl groups as potential anionic groups, it is advisable to use compounds which, in addition to free carboxyl groups, contain groups showing relatively high reactivity to isocyanate groups, more particularly hydroxyl groups. A typical example of such a synthesis component is dimethylol propionic acid which selectively reacts off with organic polyisocyanates at room temperature or moderately elevated temperature in such a way that only urethane groups are formed, the free carboxyl group remaining intact. The ethylene oxide units incorporated within polyether chains which are present in the polyurethanes preferably used as elasticizing component in accordance with the invention are preferably introduced through the use of alcohols containing lateral or terminal ethylene oxide units and/or through the use of diisocyanates containing polyalkylene side chains such as these during the production of the polyurethanes. Synthesis components such as these containing polyalkylene oxide chains incorporating ethylene oxide units are described, for example, in the following publications, some of which have already been cited in the foregoing DE-OS 2 314 512, DE-OS 2 651 506, DE-OS 2 314 513, U.S. Pat. No. 3 920 598 and U.S. Pat. No. 3 905 929.

Another possible method of introducing ethylene oxide units is to use polyether polyols containing a corresponding number of such units.

In the production of the polyurethanes to be used in accordance with the invention, the hydrophilic or potentially hydrophilic synthesis components mentioned by way of example are used in quantities sufficient to guarantee dispersibility in water. To this end, it is possible as already mentioned simultaneously to incorporate both ionic or potentially ionic groups and nonionic hydrophilic groups of the type mentioned by way of example and, preferably, both types of hydrophilic groups. Where the hydrophilic groups used are solely ionic groups or groups convertible into ionic groups, the content of hydrophilic groups in the polyurethanes to be used in accordance with the invention is preferably from 30 to 130 milliequivalents per 100 g polyurethane solids; where the hydrophilic groups used are solely ethylene oxide units, the content of ethylene oxide units incorporated within polyether chains is generally from 2 to 20% by weight and preferably from 8 to 16% by weight. Where both types of hydrophilic groups are present, the polyurethanes preferably contain 0.1 to 40 milliequivalents/100 g ionic groups or groups convertible into ionic groups and, at the same time, 0.5 to 10% by weight polyethylene oxide units incorporated within polyether chains.

If the dispersibility of the polyurethanes is guaranteed partly or exclusively by the incorporation of potential ionic groups, provision must of course be made for at least partial conversion of the potential ionic groups into ionic groups before or during dispersion of the polyurethanes, so that the content of ionic groups in the dispersed polyurethanes corresponds to the conditions stated above. Strictly speaking, polyurethanes of which the dispersibility is guaranteed partly or exclusively by the presence of potential ionic groups are of course not dispersible in water, but only in water containing a corresponding neutralizing agent.

As already mentioned, the polyurethanes containing both ionic and nonionic hydrophilic groups preferably used in accordance with the invention and also purely nonionic polyurethanes have the advantage that dispersions thereof in water are sufficiently stable to electrolytes, i.e. do not coagulate on contact with viscose. However, where the polyurethanes used have only been made dispersible in water by incorporation of ionic groups, it is generally necessary, in order to avoid coagulation of the polyurethane, to use up to 20% by weight and preferably from 1 to 10% by weight (based on the mixture as a whole) of at least one water-soluble alcohol, for example methanol, ethanol, propanol, t-butanol, glycerol, formose, formitol or polyvinyl alcohol powder (preferably ethanol), in the mixture. In addition, the mixture may contain up to 20% by weight of other organic solvents (for example emanating from the production of the polyurethane dispersions), for example acetone, methyl ethyl ketone, dimethyl formamide or N-methyl pyrrolidone. However, it is important to ensure that the organic solvents in question, together with any volatile alcohols used, can escape during the drying process because otherwise the cured composite would have inadequate mechanical strength.

The cellulose according to the invention is so-called regenerated cellulose which is also known as cellulose hydrate or hydrate cellulose. The regenerated cellulose is preferably produced by the viscose process, cf. Ullmann's Enzyklopädie der Technischen Chemie, 3rd Edition, Vol. 5, 1954, more particularly pages 201 et seq.

In the particularly preferred embodiment of the process according to the invention hydrophilicpolyurethane (see example 1), dissolved in water, is added with stirring to the viscose solution, to which NaOH or KOH is—if necessary—added to produce an alkaline pH value. The viscose/polyuethane (urea) mixture is, if necessary, degasified, filtered after the customary auxiliaries and additives have been added and then introduced into the coagulation and regeneration process via the jets already described above.

It must be described as extremely surprising that the cellulose/plastic blends according to the invention can be obtained from preferably water-soluble polyether urethanes, even though it is known to the skilled man that the water-soluble constituents are washed out again in the regenerating and washing baths This surprisingly does not occur in the present case, especially when the regenerating and washing baths are heated to temperatures of $>40°$ C.

In a further preferred embodiment of the process according to the invention, 1 to 10% by weight, based on the content of cellulose, of a dyestuff pigment, such as for example titanium dioxide, is added with stirring to the viscose/poly-urethane (urea) mixture.

The cellulose/plastic blends obtained in accordance with the invention, of which the main component consists of polyurethane (urea), may be modified in regard to their resulting properties by addition of polymers soluble in water. According to the invention, polyvinyl pyrrolidone, polyvinyl alcohol, polyethylene oxide polyethers having a molecular weight in the range from 10,000 to 50,000, polyacrylic acid and/or copolymers of the type described in DE 37 11 571 are used as an additional component of the blends.

The cellulose/plastic blends according to the invention can be provided with a fireproofing finish. In a preferred embodiment of the process according to the invention the modified and non-modified regenerated cellulose in aqueous solution is provided with fireproofing agents which can consist of: calcium chloride, magnesium chloride, ammonium dihydrogenphosphate, sodium ammonium, hydrogen phosphate, ammonium polyphosphate, phosphonium salt/urea condensates or other known, non-permanent or permanent fireproofing finishes for cellulose.

The cellulose/plastic blends according to the invention can be coloured by the known processes, for which purpose water-soluble dyestuffs are used.

Auxiliaries and additives are also understood to include the use of auxiliaries and additives of the kind customarily employed in the viscose fibre industry.

The molded articles obtainable after carrying at the process according to the invention can be lacquered to protect them from ageing processes. Suitable lacquers for this purpose are those which can be applied from an aqueous or solvent-containing phase, such as for example, nitrocellulose. Particularly preferred lacquers are those which do not prevent the biological degradability of the molded articles.

The biological degradability of this film has been confirmed in composting and laboratory tests with simulated composting. The average degradation times of a 25 μm thick film in a composter are 1 to 2 weeks.

EXAMPLES

Example 1

Production of a water-soluble polyurethane (preferred Blendpartner)

2.25 mol (4.5 kg) of a propylene-glycol-started polyether ($\overline{MW}$ 2,000, OH value 56), in which 50% ethylene oxide and 50% propylene oxide were statistically polyadded, are mixed with 0.25 mol (0.3875 kg) of an ethylene-glycol-started polyether ($\overline{MW}$ 1,550, OH value 72), in which 100% ethylene oxide was polyadded, and the resulting mixture was freed from water for 30 minutes at 120° C. in a water jet vacuum.

2,375 mol(0,5273 kg) isophorone diisocyanate and 0.1 g dibutyl tin dilaurate are then added to the mixture. The mixture is stirred for 2 hours at 130° to 140° C. and is then free from NCO (IR).

The colorless to light yellowish polyurethane is highly viscous at room temperature.

Example 2

1 kg of the polyurethane (PUR) of Example 1 is dissolved in 1 kg water at room temperature. A clear colorless solution having a viscosity of 5000 mPa.s (25° C.) is obtained.

Example 3

A commercial polyurethane urea dispersion in water is prepared in accordance with Example 1 of DE-A-26 51 506. The dispersion has a solids content of 50% and contains approx. 3% by weight polyethylene oxide segments and 3 m equivalents sulfonate groups/100 g solids.

Example 4

Production of a cellulose/polyurethane blend according to the invention 20 kg of an alkaline viscose solution containing 9.2% by weight cellulose (viscosity 7,700 mPa.s/25° C.) are mixed with 1.84 kg of a 10% by weight solution of the polyurethane of Example 2 at room temperature.

A clear, speck-free yellow blend solution (I) having a viscosity of 7,900 mPa.s/25° C. is formed. The blend solution (I) is degassed while stirring by application of a vacuum, subsequently transferred to a storage vessel and then pumped from there into a slot-like coater. The cellulose/plastic blend then passes through the usual baths for coagulation, regeneration and drying typical of the viscose process. A film-form molding having outstanding mechanical properties is obtained. The film obtained can be wound onto a roll without crackling. The biological degradability of the film was established using communal effluents.

The film web obtained was lacquered on one side and on both sides by standard methods using PVDC and nitro lacquer. High-gloss, non-crackling films are obtained.

Example 5

The procedure is as described in Example 4, except that 1.84 kg polyurethane in the form of a 10% aqueous solution and 0.0368 kg polyvinyl pyrrolidone are added to the alkaline viscose solution.

Example 6

The procedure is as described in Example 4, except that 1.84 kg polyurethane in the form of a 10% aqueous solution and 0.0368 kg polyvinyl alcohol are added to the alkaline viscose solution.

Example 7

The procedure is as described in Example 4, except that 1.84 kg polyurethane in the form of a 10% aqueous solution and 0.0368 kg of a diethylene-glycol-started ethylene oxide polyether, $\overline{MW}$ 20,000, are added to the alkaline viscose solution.

After drying, the cellulose/plastic blends obtained in accordance with Examples 5, 6 and 7 have a soft feel and excellent mechanical properties.

Example 8

The procedure is as described in Example 4, except that 8 kg of the polyurethane polyurea dispersion of Example 3 is added to the alkaline viscose solution.

Example 9

The procedure is as described in Example 8, except that 0.0368 kg of a standard additive, namely an ethoxylated fatty amine, is also added to the viscose/PUR blend.

Example 10

The procedure is as described in Example 4, except that 9.2 kg of the polyurethane solution of Example 2 are added to the alkaline viscose solution. A tear-resistant, opaque film having a particularly soft feel is obtained after drying.

We claim:

1. A blend of cellulose hydrate and at least one additional component, characterized in that it contains a polyurethane (urea) as an additional blend component.

2. A blend as claimed in claim 1, characterized in that at least 20% by weight of the blend consists of cellulose hydrate.

3. A blend as claimed in claim 1, characterized in that at least 5% by weight of the additional component is a polyurethane (urea).

4. A blend as claimed in claim 1, characterized in that polyvinyl pyrrolidone and/or polyvinyl alcohol and/or polyethylene oxide polyether and/or copolymers thereof are additionally present.

5. A blend as claimed in claim 1, characterized in that the polyurethane (urea) used contains 0.1 to 4 milliequivalents ionic groups or groups convertible into ionic groups, based on 100 g polyurethane (urea), and 0.5 to 10% by weight ethylene oxide units incorporated in polyether chains.

6. A blend as claimed in claim 1, characterized in that the polyurethane used is synthesized from isophorone diisocyanate, hexamethylene diisocyanate or perhydrodiphenyl methane diisocyanate.

7. A blend as claimed in claim 1, characterized in that chain-extending agents of the butane diol, hexane diol, ethylene glycol, hexamethyl diamine or bis-(3-aminopropyl)-methyl amine type are used individually or in admixture with others in the synthesis of the polyurethane (urea) used.

8. A blend as claimed in claim 1, characterized in that the polyurethane used is synthesized from water-soluble polyethers having a molecular weight in the range from 400 to 10,000 and diisocyanates.

9. Process for the production of cellulose/plastic blends according to claim 1, characterised in that viscose is mixed with the blend constituents, if necessary using additional auxiliaries and additives, and the mixture is then converted into cellulose hydrate gel blends by means of acidic coagulating and regenerating agents at $T>40°$ C., treated with customary plasticisers and then dried.

10. Use of the blends according to claim 1, as biologically degradable packaging materials, in particular flat films and tubular films, for example for use as packaging materials, bin liners, plastic shopping bags, mulch and silo sheets for the agricultural sector, hygiene articles, external wrappings for babies nappies, transparent paper, copying films and decorative material.

* * * * *

UNITED STATES PATENT AND TRADEMARK OFFICE
CERTIFICATE OF CORRECTION

PATENT NO. : 5,166,232

DATED : November 24, 1992

INVENTOR(S) : Muller et al.

It is certified that error appears in the above-identified patent and that said Letters Patent is hereby corrected as shown below:

Col. 17, line 15   Delete " 4 " and substitute -- 40 --

Signed and Sealed this

Tenth Day of May, 1994

*Attest:*

BRUCE LEHMAN

*Attesting Officer*     *Commissioner of Patents and Trademarks*